United States Patent
Mehta et al.

(10) Patent No.: US 10,834,514 B2
(45) Date of Patent: Nov. 10, 2020

(54) REPRESENTATION OF CONTEXTUAL INFORMATION BY PROJECTING DIFFERENT PARTICIPANTS' AUDIO FROM DIFFERENT POSITIONS IN A 3D SOUNDSCAPE

(71) Applicant: Akamai Technologies, Inc., Cambridge, MA (US)

(72) Inventors: Abhijit C. Mehta, Mountain View, CA (US); Charles E. Gero, Quincy, MA (US); Thomas Houman, Beverly, MA (US)

(73) Assignee: Akamai Technologies, Inc., Cambridge, MA (US)

(*) Notice: Subject to any disclaimer, the term of this patent is extended or adjusted under 35 U.S.C. 154(b) by 0 days.

(21) Appl. No.: 15/857,694

(22) Filed: Dec. 29, 2017

(65) Prior Publication Data

US 2018/0192219 A1 Jul. 5, 2018

Related U.S. Application Data

(60) Provisional application No. 62/440,473, filed on Dec. 30, 2016.

(51) Int. Cl.
  *H04R 5/02* (2006.01)
  *H04S 1/00* (2006.01)
  (Continued)

(52) U.S. Cl.
  CPC .............. *H04S 1/002* (2013.01); *G06F 3/165* (2013.01); *H04L 65/403* (2013.01);
  (Continued)

(58) Field of Classification Search
  CPC . H04S 1/00; H04S 1/002; H04S 1/005; H04S 2400/11; H04L 65/40;
  (Continued)

(56) References Cited

U.S. PATENT DOCUMENTS

2010/0316232 A1* 12/2010 Acero .................. H04M 3/568
                                                                381/92
2013/0058470 A1* 3/2013 Davis .................... H04M 7/128
                                                                379/93.09

(Continued)

*Primary Examiner* — Leshui Zhang
(74) *Attorney, Agent, or Firm* — David H. Judson

(57) ABSTRACT

An overlay network platform facilitates a multi-party conference. End users participate in the conference using client-based web browser software. According to this disclosure, an enhanced "audio" experience for a user participating in the conference is provided by rendering different participants' audio in the conference at different positions in a three-dimensional (3D) space. In operation, and given a set of audio streams that comprise the conference and that are being received, a three-dimensional (3D) position for each audio stream in a 3D soundscape is computed. In one embodiment, the 3D position for each audio stream is computed by identifying a target area region of space, and then determining the 3D position for each stream in the target area region of space. The relative 3D positions may be determined based on contextual information related to the content of an audio stream, as well as a computed "relevance" of one stream versus another. The streams are then rendered to the listener based on the computed 3D positions.

14 Claims, 5 Drawing Sheets

(51) Int. Cl.
  *H04L 29/06* (2006.01)
  *G06F 3/16* (2006.01)
  *H04N 7/15* (2006.01)

(52) U.S. Cl.
  CPC .............. *H04L 65/604* (2013.01); *H04N 7/15* (2013.01); *H04S 2400/11* (2013.01)

(58) Field of Classification Search
  CPC .............. H04L 65/403; H04L 65/4038; H04L 65/4046; H04L 65/4053; H04L 65/60; H04L 65/601; H04L 65/604; G06F 9/45529; G06F 21/128; G06F 3/048; G06F 3/0484; G06F 16/64; G06F 3/16; G06F 3/167; G06F 16/44; H04N 5/4403; H04N 21/47; G06T 3/00; G06T 3/0006; G06T 11/60; G06T 2207/20016
  USPC ....... 381/300–307, 61, 77, 82, 85, 104, 106, 381/107, 110, 111, 116, 117, 119, 122, 381/123, 1, 22; 379/93.21, 157, 158, 379/159, 160, 161, 202.01, 205.01; 455/416; 700/94; 715/716, 727, 728, 715/978

See application file for complete search history.

(56) References Cited

U.S. PATENT DOCUMENTS

| | | | |
|---|---|---|---|
| 2015/0052455 A1* | 2/2015 | Boustead | G06F 3/0484 715/753 |
| 2015/0055808 A1* | 2/2015 | Vennstrom | G06F 3/167 381/307 |
| 2017/0010853 A1* | 1/2017 | Gelles | G06F 3/165 |

* cited by examiner

REPRESENTATION OF CONTEXTUAL INFORMATION BY PROJECTING DIFFERENT PARTICIPANTS' AUDIO FROM DIFFERENT POSITIONS IN A 3D SOUNDSCAPE

BACKGROUND

Technical Field

This application relates generally to network-based conferencing wherein participants "listen" to and participate in the conference using a web browser and, in particular, to techniques to enhance delivery of audio to such conference participants.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

Real-time communications (e.g., videoconferencing, shared document editing, screen sharing, and the like) over the Internet have been a part of our daily lives at work and at home. WebRTC, an Internet standard, was created to make videoconferencing and point-to-point data transfer easier to implement. In particular, WebRTC (which stands for Web Real Time Communications) seeks to take the most critical elements of video chat and move them to one of the most commonly used tools for accessing the Internet, namely, a web browser. WebRTC is supported with plugins by both Google Chrome and Mozilla Firefox. It allows the browser to access the client machine's camera and microphone, provides a method for establishing a direct connection between two users' browser and to use that connection to send audio and video, and it provides a method for sending arbitrary data streams across a connection.

BRIEF SUMMARY

An overlay network platform facilitates a multi-party conference. End users participate in the conference using client-based web browser software, and using a protocol such as WebRTC. According to this disclosure, an enhanced "audio" experience for a user participating in the conference is provided. To this end, a method is implemented at a client machine to render different participants' audio in the multi-party conference at different positions in a three-dimensional (3D) space. In operation, and given a set of audio streams that comprise the conference and that are being received, a three-dimensional (3D) position for each audio stream in a 3D soundscape is computed. In one embodiment, the 3D position for each audio stream is computed by identifying a target area region of space (e.g., a 45° cone positioned a given distance in front of the listener), and then determining the 3D position for each stream in the target area region of space. The relative 3D positions may be determined based on contextual information related to the content of an audio stream, as well as a computed "relevance" of one stream versus another. Alternatively, the relative 3D positions of the audio streams may be deterministic (e.g., equally spaced). Given streams may be positioned relative to one another, e.g., up or down, left or right, forward or backward. Each audio stream is then rendered (output or played) to the listener at the 3D position computed, e.g., using the HTML5 Web Audio API.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
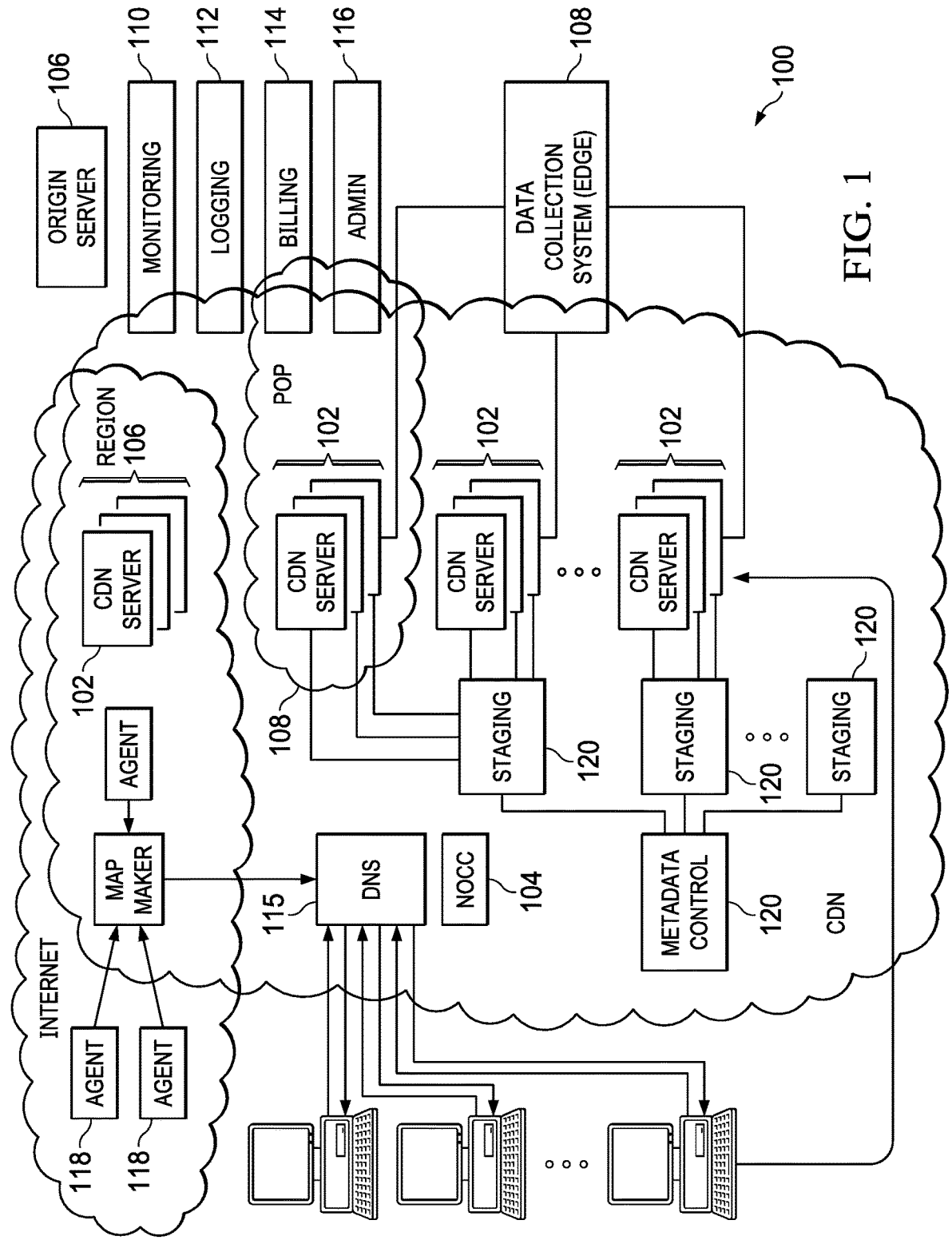
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
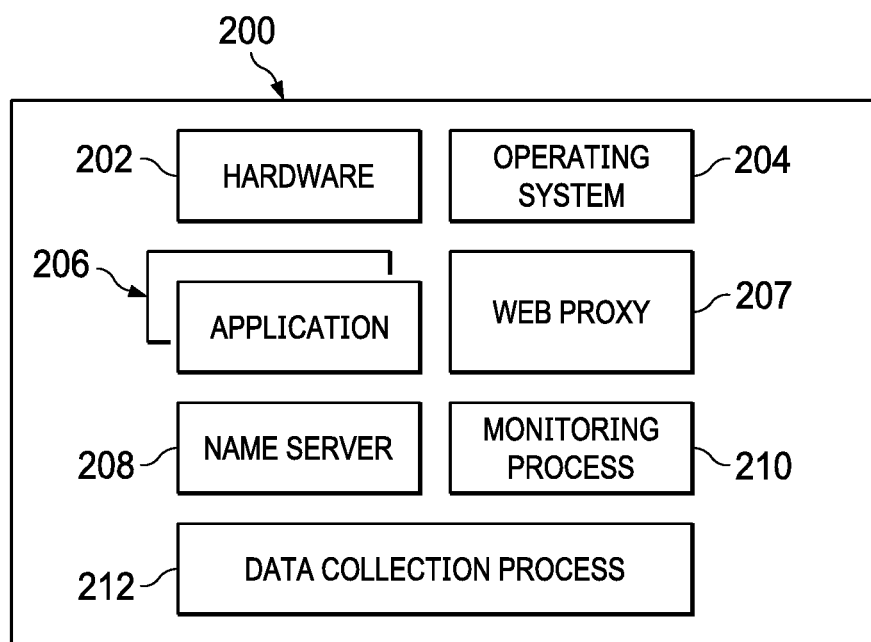
FIG. 2 is a representative CDN edge machine configuration.

As illustrated in FIG. 2, a given machine 200 in the content delivery network comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine may include one or more media servers, such as a Windows Media Server (WMS) or Flash server, as required by the supported media formats, or it may utilize HTTP-based delivery of chunked content fragments that constitute a stream.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Unified Browser-Based Enterprise Collaboration Platform Using an Overlay Network The following assumes familiarity with WebRTC.

Traditional point-to-point communication and collaboration tools, such as LifeSize, WebEx, and Skype, require specialized applications and infrastructure. The WebRTC APIs have the potential to make direct point-to-point communication ubiquitous by bringing it to the browser. As described above, WebRTC enables video communication and collaboration without any additional plugins or software. That said, however, there are still a number of challenges remaining for an entity that wants to deploy a WebRTC-based application. Thus, for example, a relay infrastructure (using TURN) is needed to establish connections between two peers behind NATs, and building a robust and scalable relay infrastructure is challenging. Additionally, multi-user video conferencing over WebRTC requires full mesh connectivity between all users; that is, a separate connection must be established between each pair of users. Each user needs to upload their video (and other data) multiple times—once for each peer—and the resources required grow in a way proportional to the square of the number of users, which does not scale. These issues are not limited to WebRTC; indeed, existing, dedicated video conferencing solutions struggle with the same problems. For example, Microsoft's Skype relays are often overloaded, significantly impacting the quality of Skype calls that cannot use a direct peer-to-peer connection. LifeSize needs the same full-mesh connectivity described above, which severely limits the number of different remote sites that can participate in one meeting.

To address these issues, and according to one aspect of this disclosure, an overlay network fabric is used. In particular, by distributing multiplexing and the relay infrastructure over a platform, such as a CDN (as described above), a solution that facilitates multi-user collaboration, such as video conferencing, chat, document sharing, and desktop sharing, is provided. While a primary use case as described below is for high-quality video conferencing that is scalable to large numbers of users, this is not a limitation, as the cloud-supported multiplexing and relay techniques herein may be used to provide other multi-user collaboration, such as chat, document sharing, and desktop sharing, all in a seamless and scalable manner. The overlay network can also provide additional functions and features to support a collaboration session; these may include, without limitation, persistent storage and recording of sessions and documents, integration with existing videoconferencing and telecommunications infrastructure (LifeSize rooms, PSTN, etc.), and others.

Figure 3:
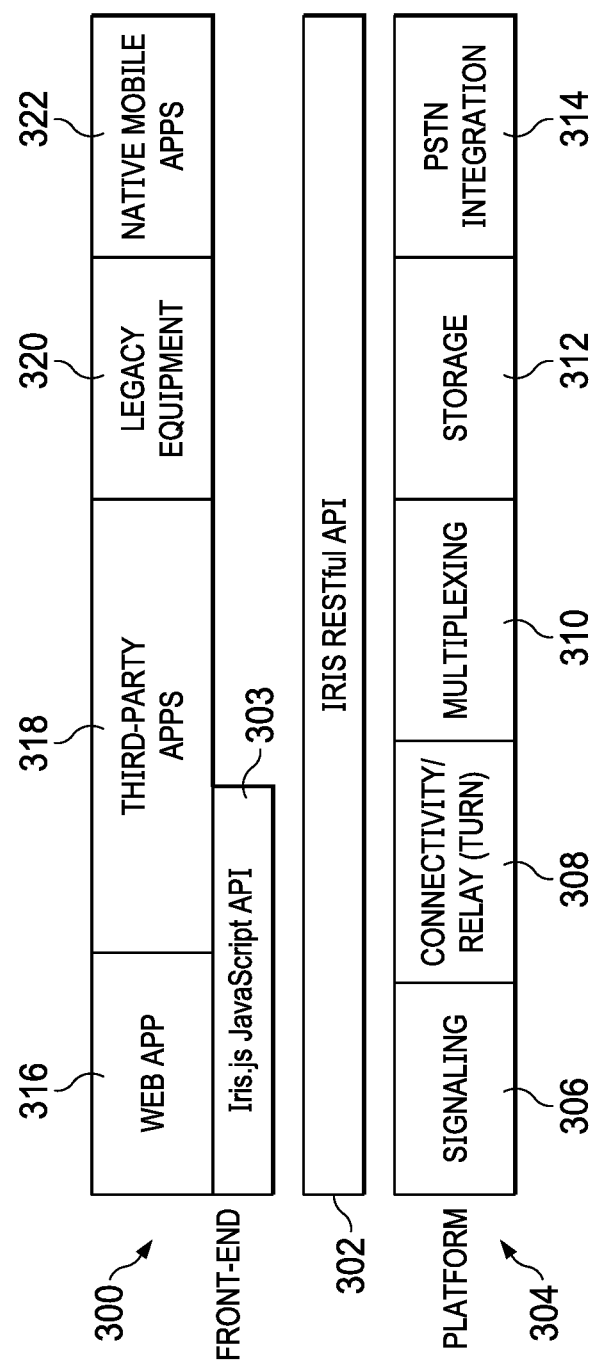
FIG. 3 depicts the various components of a web-based collaboration solution according to this disclosure.

FIG. 3 depicts a representative architecture 300 for an enterprise collaboration platform using an overlay network according to an aspect of this disclosure. There are three primary elements: a front-end application 300, RESTful APIs 302, and a back-end or platform 304. The front-end application (app) 300 preferably is built on a number of components (described below) that are preferably accessed through the one or more RESTful APIs 302. As will be seen, this architecture allows on-premises infrastructure to be integrated with the solution, and it could also be used to allow third parties to create applications powered by the platform. The platform components 304 include signaling 306, connectivity 308, multiplexing 310, storage 312, and PSTN integration 314. In one embodiment, the platform 304 comprises part of an overlay network (or leverages elements thereof), but this is not a requirement, as the solution herein may be provided as a standalone architecture. Further, the notion of a "component" herein may involve multiple machines, whether co-located or distributed, as well as the processes and programs executing thereon.

Turning first to the platform, the signaling component 306 preferably is a distributed signaling system that keeps track of users' state (e.g., "Online", "Away", "Busy", etc.), and it is used to transmit the information (i.e., SDP) necessary to initiate an RTCPeerConnection. The signaling component 306 preferably integrates with various user authentication and identity management solutions, although this is not a requirement. The connectivity component 308 manages video, voice and data connections routed though the overlay network platform to handle Network Access Translation (NAT) traversal, as well as to provide enhanced performance and security.

The multiplexing component 310 comprises multiplexing machines to allow for scalable, multi-peer sessions. This component makes it so that each peer only needs to upload its media stream once. Other peers are then able to access peers' media streams through overlay network edge machines (rather than by direct connections to peers). The multiplexing component provides for multiplexing in the cloud to significantly reduce edge bandwidth requirements that would otherwise be required to support WebRTC (which otherwise dictates a new connection be setup for pair of peers in a multi-user collaboration). With this approach herein of using the overlay network, there is no requirement to setup a new connection for each pair of peers in a multi-peer collaboration (conference, chat, etc.) session.

As will be described, and as a further feature, preferably the multiplexing component 310 intelligently adjusts the quality of different users' streams to enhance performance—e.g., only deliver HD streams for people who are currently speaking, deliver lower-quality streams to mobile devices, etc.

The storage component 312 allows overlay network customers to (optionally) store data from a collaboration session (e.g., record a meeting, save work on a collaborative document, etc.). The PTSN integration component 314 allows users to join sessions from the PSTN and legacy telecommunications equipment, and it allows users to call out over the PSTN. Although not depicted, the platform may include a transcoding component that allows for communications between browsers that do not have the same video codecs implemented, and for one-way broadcasting to browsers that do not support WebRTC.

As noted, the front-end components 300 interact with the back-end platform 304 using an application programming interface, such as RESTful APIs 302. These APIs 302 provide methods for exchanging SDPs to set up calls, provide information on which chat rooms are available, which media streams are available in each chat room, which user media streams in a given chat room are most "relevant" at any given moment, and so forth. The APIs preferably also provide methods for interacting with other parts of the back-end, e.g., verifying users' identities, accessing storage (saving data, retrieving data, searching), and the like. As also depicted, the APIs also preferably include a JavaScript (JS) API 303, referred to herein as "iris.js," which is a thin layer on top of the base WebRTC API and other HTML5 components. The iris.js API 303 preferably uses the other RESTful APIs to integrate with the overlay network fabric. In particular, the iris.js API allows applications to establish and use video, voice, and data channels. Preferably, the front-end web app is built on the JavaScript API, and third party applications may use this API to build apps that seamlessly integrate with the platform.

The front-end components 300 comprise a web application (or web app) 316, which is a unified communication tool built on iris.js. The web app 316 routes video, voice, and data through the overlay network fabric. The web app also provides (or interfaces to) one or more collaboration functions or technologies, such as video chat, collaborative document editing, desktop sharing, and the like. Because the web app 316 preferably is built in an API (such as iris.js 303, which can support several data channels), it is easily extensible. Thus, users are able to choose which voice, video, and data channels to connect to for a given session—for example, several users in a video conference room could use the room's camera and mic for videoconferencing with a remote site, but each individual user might use his or her personal laptop to edit a shared document. Preferably, the web app 316 is skinnable so it can be rebranded and used by enterprise customers. As noted, because iris.js is built on top of the WebRTC API's, third parties are able to easily adapt existing WebRTC applications to use the solution described herein. The third party applications 318 are depicted here as part of the front-end, but they may be separate and distinct. As noted above, the RESTful API 302 also makes integration with other collaboration tools possible. As also depicted, the front end may include or have associated therewith legacy on-premises equipment 320, such as Life-Size rooms. Further, the front-end may include or have associated therewith native mobile apps 322, such as devices and tablets that run native iOS and Android apps (as opposed to HTML5 apps in mobile browsers, which are also supported). The API layer 302 enables a service provider or third parties to easily build native mobile applications for the solution.

Figure 4:
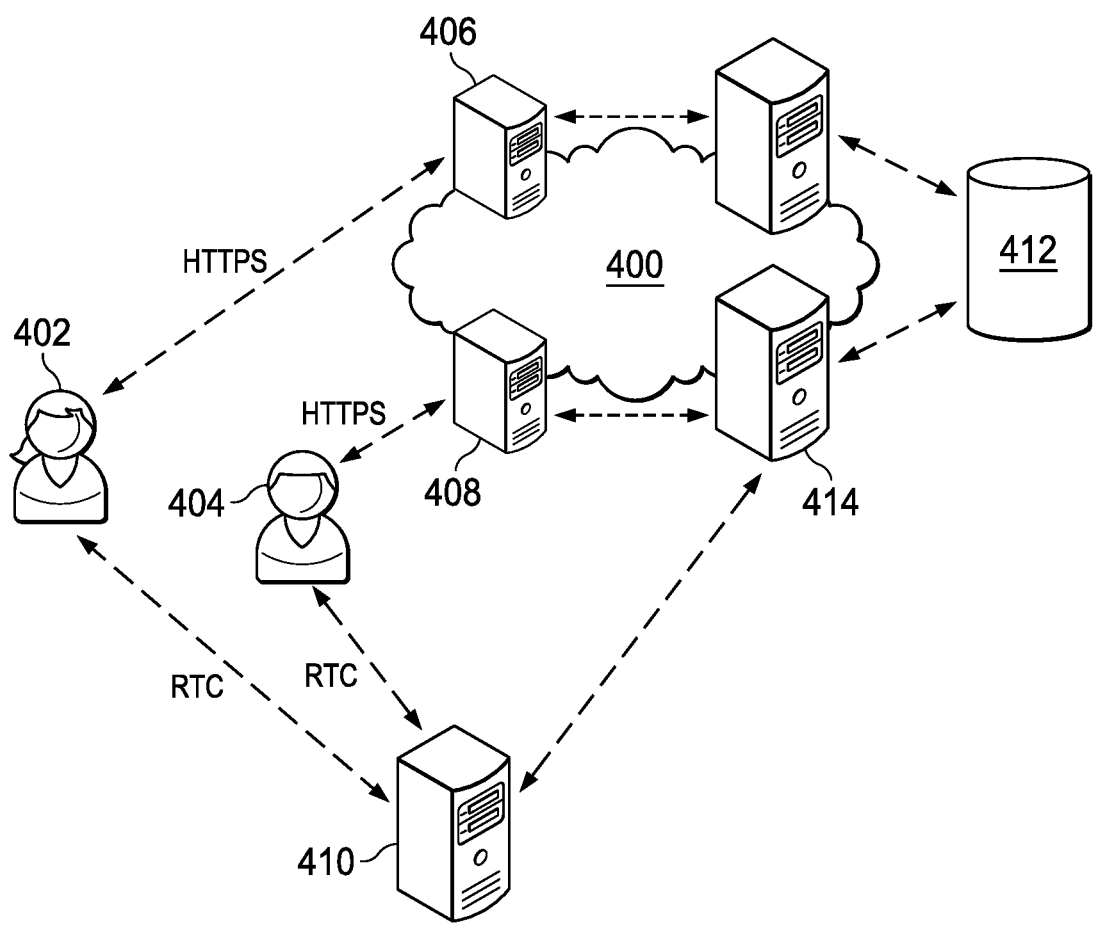
FIG. 4 illustrates a multi-party videoconference setup that is enabled by associating the web-based solution of this disclosure with an overlay network.

In one embodiment, the above-described solution provides a multi-party voice and video chat system. FIG. 4 depicts further implementation details of a multi-party solution implemented within an overlay network 400, such as the Akamai content delivery network (CDN). As depicted, there are two end user peers 402 and 404, and each peer is associated (e.g., using conventional CDN DNS mapping operations) to respective edge servers 406 and 408. Each peer also establishes a WebRTC connection to a media server 410 that hosts the videoconference (in this example scenario). A signaling back-end is powered by a distributed data store 412. In an example implementation, the platform is implemented using a combination of Node.js, PHP, Apache, Cassandra, and Kurento Media server running on Ubuntu Linux machines. Cassandra data is accessed via the RESTful API, which is powered by Node.js running behind an Apache proxy 414. In this approach, signaling information is exchanged via HTTPS interactions using the RESTful API. Multiplexing is accomplished using the Kurento Media Server running on cloud Ubuntu VMs running in geographically-distributed locations. In operation, the Node.js signaling application performs a DNS lookup to the CDN mapping to determine an optimal (in terms of one or more factors such as latency, loss, load, availability, reachability, etc.) media server to which as client should connect. Clients upload their live media stream via WebRTC to the chosen media server. The connection is set up by the signaling layer through the RESTful API. Other clients who wish to subscribe to that media stream connect to the same media server (via the signaling layer) and receive the stream.

While the approach shown in FIG. 4 is typical, it is not a limitation. In an alternative embodiment, the underlying network environment may allow for direct connectivity between peers. This requirement is met among users, for example, as long as peers are connected to an enterprise VPN. Another approach is to use STUN and TURN servers that run, for example, on cloud virtual machine (VM) infrastructure. In still another embodiment, a TURN-compliant version of a relay network for peer-to-peer connectivity may be used. In the multi-party case described above, STUN and TURN are not needed because it is assumed that clients can connect directly to multiplexing servers. Still another approach to connectivity may involve a multicast overlay network to distribute streams.

In this example implementation, the API is powered by a Node.js web application. The Node.js application interacts with Kurento Media Server and Cassandra to orchestrate calls. The "iris.js" JavaScript API is a client-side ECMAScript 6 library that allows web applications to interact with the system via the Iris RESTful API. It contains functionality that allows for easy WebRTC connection management, call orchestration, and automatic, dynamic quality switching, e.g., as the relevancy of different participants in a room changes. The web application is an HTML5 Web App written on top of iris.js. The views are powered by a PHP application.

Representation of Contextual Information in a 3D Stereophonic Soundscape

According to this aspect, it is assumed that there are multiple participants to a conference, such as a videoconference (or even just an audio conference), that is being facilitated using the above-described platform in association with the overlay network. In this aspect, different participants' audio is then projected from different positions in a 3D stereophonic soundscape in the following manner.

In particular, preferably the HTML5 Web Audio API is used to have a client browser render different participants' audio at particular positions in 3D space. The 3D position of a speaker might depend on one or more factors, such as a position of that person's video window in the screen, whether that person is speaking, the location of the person, when the person joined the call, or simply by hashing the speaker's ID to a position on a ring. Different speakers' relative positions may remain stable to communicate contextual information. Users move "forward" and "backward," or "up" and "down" in space, as their relevancy (as described below) changes.

The implementation is in client-side JavaScript running in a web browser, preferably that functions as follows:

Given a set of audio streams (via WebRTC or HTTPS), the client computes a 3D position for each audio stream by carrying out a set of operations.

Figure 5:
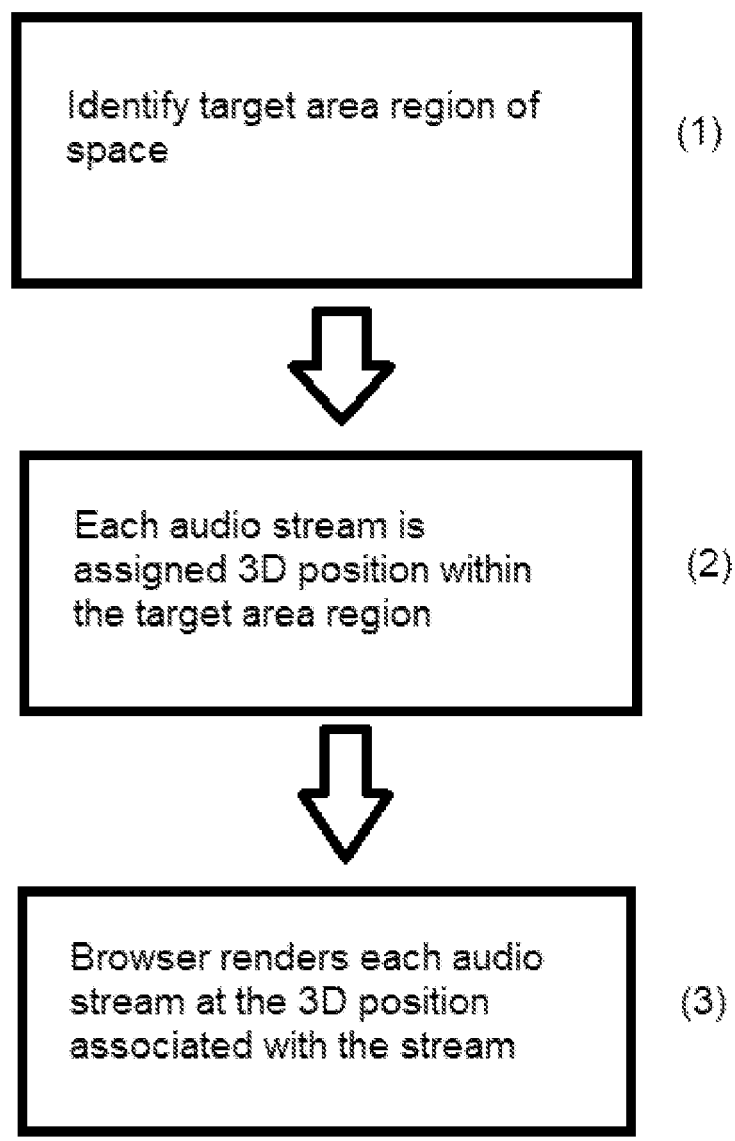
FIG. 5 is a process flow depicting a method of this disclosure.

A method according to this disclosure is depicted in FIG. 5. At step (1), a "target area" region of space is identified. Typically, this region is in front of the listener (e.g., within a 45° cone in front of the viewer, and between, say, 30 cm and 3 m away from the listener.

At step (2), each audio stream is assigned a 3D position within that target region as follows. In this discussion, "left," "right," "up," "down," "forward" and "backward" are from the listener's perspective. If applicable (i.e., if video corresponding to the audio stream is displayed in the browser window), the 3D position corresponds to the point on the screen where the video is displayed; otherwise, the stream is given a position based on contextual information related to the content of the stream. For a multiparty real-time video conversation, preferably this is done as follows: a hash function takes a unique identifier for each stream (e.g., each participant's name), and maps that to a left/right position within the target area. Thus, each individual speaker will maintain a stable position relative to other speakers, even if other speakers join or leave the conference. Alternately, a hash function maps each stream's unique identifier to a number in the range [0,1], and then each stream is assigned a position within the left/right target region such that the positions are evenly (or otherwise deterministically) spaced within the target region. Preferably, the up/down and forward/backward position are then based on "relevancy" and other contextual information for each stream. For example, if one person is giving a presentation, their position may be "up" relative to other participants (who may be asking questions). Or, someone who just joins the room may be "back" compared to someone who has recently spoken.

At step (3), and using the HTML5 Web Audio API, the browser renders each audio stream at the 3D position associated with it in step (2). The audio is played over the browser's stereo (or surround sound) speakers. The effect to the end user is that it will sound like each stream originates at its associated 3D position.

Preferably, steps (2) and (3) are performed continuously, so, for example, as an individual stream's associated 3D position changes, the end-user experiences this as that stream "moving" in the stereophonic soundscape.

If relevancy support is included in the solution (and this is not required), the following details may be implemented.

Dynamic Speaker Selection and Live Stream Delivery for Multi-Party Video Conferencing As noted above, traditional multiparty videoconferencing methods involve gathering an audio/video stream from each individual end user's client, and distributing each user's stream to all other end users. The delivery of these streams is usually facilitated by either a full-mesh topology or a centralized multiplexing server. That approach does not scale to large numbers of users.

As an alternative, the following describes a method comprising server- and client-based logic for intelligently and dynamically determining which streams are most important—i.e., which streams correspond to users who are currently speaking, have spoken recently, or are about to speak—and delivering those streams at higher quality. Remaining users' streams are delivered at lower video quality (or audio-only). This approach saves bandwidth and enables scalable, real-time multi-party videoconferencing. Stated another way, while each client consumes a fixed total bandwidth, the way in which the bandwidth is apportioned is dynamically adjusted to enhance user experience.

According to this approach, the platform maintains a set of variables, continuously updated for each participant, which are then used to determine an importance or relevancy of each user's audiovisual (a/v) stream. Preferably, these variables are derived from multiple sources, including audio filters, video filters, user input, and other measures of individual and group behavior. Example variables/filters include, without limitation: speaking (audio), crowd noise (audio), face detection (video), group detection (video), microphone mute (user input), raise hand (user input), and so forth. Preferably, the variables are used to construct a probability density function (PDF) across several possible stream "attributes," such as whether a stream represents an individual speaking, a small group, an individual who is participating in a conversation, audience members who are reacting to a main presenter, and so forth. In particular, preferably heuristics are built by leveraging statistical modeling and/or machine learning (ML) techniques (e.g., using a training set of users in a multi-party context) to construct PDFs for each attribute, e.g., from (raw or smoothed) measurements of the variables. Preferably, these PDFs are combined using relative weighting techniques to drive both client and server behavior.

The nature of the relative weighting techniques may vary. There may be a predefined set of techniques, or a set of best practices, a default set, or some combination.

Thus, in the client case, preferably the PDFs, along with information on the client device's capabilities and network connectivity, are used to drive the end-user experience. For example, the video images of different speakers on the screen and the loudness of different speakers' audio streams may be given different prominence based on the relevance of each speaker, and on the capabilities of the client. In this manner, a client with a high-bandwidth connectivity displays the two most "relevant" speakers in HD, N other speakers in small video windows, and only audio for everyone else, whereas a mobile client with low connectivity displays only one low-quality video, and audio for everyone else. These are just representative examples of course. In the server case, the PDFs preferably are used to guide routing and multiplexing of individual user streams. Streams that are more relevant may be afforded increased bandwidth and resource allocation. The PDFs may also be used to guide assignments of streams to different media servers. In both the client and server cases, preferably one or more additional transforms, such as decay functions, are used to dampen oscillations in relevancy changes. For example, if two people are speaking, the decay function prevents constant switching between each person's video.

The following describes one implementation using the above-described collaboration infrastructure. In this example, the clients are browsers, and the servers are cloud machines. Logic is implemented in client-side JavaScript, and in the server-side in Node.js JavaScript. As noted above, preferably client-server API calls are via RESTful HTTPS requests, and the media flows are via the HTML5 WebRTC API.

At step (1), a client makes a RESTful API call via HTTPS to the server indicating that it wants to join a conference. At step (2), the server adds client to conference. Typically, this involves adding information to a distributed database. At step (3), the client makes another API request indicating what type of media it has to offer (audio, video, etc. . . . ), what capabilities it has (e.g., total bandwidth does it have, type of device, number of video streams it can handle, number of HD video streams it can handle, how many lower quality streams, etc.). The information on client capabilities typically comes from several sources, such as information that the client explicitly sends in the API request, information (e.g., on the client's hardware capabilities, on the client's connectivity performance, etc.) that is collected by a client-side JavaScript code (using HTML5 APIs such as the Navigation Timing API, the Web Performance API, and the Network Information API, and WebRTC), and information that is inferred from server-side code, such as the client's User-Agent, the network performance of ISP/network that the client is in, and the actual measured bandwidth, throughput, latency, etc., to the client. At step (4), the server allocates resources for the media stream that the client will upload. Typically, this step involves making a DNS request to a load balancer to find a free media server, communicating the offer/answer SDP information needed to create a WebRTC connection between the client and the media server, and recording information about the connection in the database. At step (5), the server adds the client to list of participants in room, and assigns an initial relevancy. As noted above, relevancy is preferably a multi-dimensional data structure that comprises one or more variables derived from multiple sources, including audio filters, video filters, user input, and other measures of individual and group behavior. Example variables/filters include: speaking (audio), crowd noise (audio), face detection (video), group detection (video), mic mute (user input), raise hand (user input), and the like. At step (6), the server compiles a list of all participants in room along with each client's full multi-dimensional relevancy, as well as a summary score.

Preferably, clients can determine an ordered ranking of which participant in the conference is "most relevant" based on the summary score. In one exemplary but non-limiting embodiment, the "summary" can comprise a single variable (e.g., time since hand last raised), a weighted average of variables, the PDFs as described above, or some combination.

At step (7), clients periodically poll the server for changes to the participant list and the relevancy for each participant. In lieu of polling, clients may also be notified via a push notifications or via a publisher/subscriber system). At step (8), clients also periodically send information back to the server that is used to build their relevancy object and summary scores. The server combines this information with information that it collects (for example, information from server-side a/v filters, information on how long a client has been in a room, etc.) and continuously updates the relevancy object and summary score for each participant.

At step (9), clients change which WebRTC media streams they subscribe to, preferably via the following mechanism: (i) first, given the client capabilities (step (3)), the client knows what kind of stream it can handle (e.g., N high-quality streams, M low-quality streams, S audio streams, and so forth); (ii) the client JavaScript (iris.js) sorts the other participants in order of "summary" relevancy score; (iii) the client then associates the most relevant participants with the highest quality streams, preferably in order; and (iv) updates the associations as needed, e.g., by examining if a client is associated with a different quality stream than the client is currently subscribed, unsubscribing from the old quality stream and subscribes to the quality of stream that the client is currently associated with. In other words, the client JavaScript seamlessly swaps the different qualities so that an interruption is not visible to the end user. Subscription preferably is via API calls, as described in step (4).

Thus, for example, if a client can handle 1 HD stream 4 low-quality streams, and 100 audio streams, then the participant with the highest summary relevancy will get the HD stream, the next 4 highest summary scores will get low-quality streams, and the remaining participants will be associated with audio-only streams. As a more concrete example, if Alice is speaking and Bob is quiet, a third client may be subscribed to an HD stream for Alice and an SD stream for Bob. If Bob starts speaking, then the client will drop the HD connection to Alice and switch to an SD connection. The client will then subscribe to an HD connection for Bob and swap that in for the old SD connection.

Although not intending to be limiting, for each new WebRTC media stream description, preferably the client makes a series of API calls to the server to allocate media server resources and to broker a new connection in a way that is analogous to step (4) above.

An alternative method in step (9) involves having each client subscribe to only one WebRTC media stream per other participant. Here, the server performs the above steps of sorting participants based on summary relevancy score, and the server takes care of adjusting the quality of each stream when summary relevancy score changes. In this case, however, the client does not have to subscribe/unsubscribe to a different quality WebRTC stream at any time; clients only need to subscribe/unsubscribe to WebRTC streams when other participants join/leave the conference. The server keeps track of a maximum total bandwidth that a given client can handle, and it makes sure that the aggregate quality of all WebRTC streams delivered to that client is below the maximum total bandwidth threshold. In this case, the client only needs to consume the relevancy to handle the following step.

At step (10), JavaScript on the client preferably uses the full multi-dimensional relevancy object to determine how to display other participants' video in the browser window. Thus, for example, current speakers are given a position of prominence, people with hands raised are highlighted, etc.

In summary, each client always consumes an amount of bandwidth that is below a fixed maximum, but within this constraint, the bandwidth is dynamically apportioned such that the most-relevant participants are delivered at the highest quality, resulting in an enhanced experience for the end-user.

Thus, and according to this aspect, dynamic quality adjustment is driven (e.g., by the client) using relevancy. Relevancy is a property of each media stream; preferably, it is a multi-dimensional object that contains information such as whether the user is speaking, whether the user has muted his or her microphone, how recently the user spoke, if the user is raising his or her hand, that is used to determine which streams are most important. Preferably, server-side switching is used so that only the most relevant streams are delivered, say, at high quality. In another embodiment, switching is done by the client; in particular, the server lets the client know the relevancy of all participants' streams, and the client (based on its capabilities), dynamically subscribes to the high-quality version of the most relevant streams and low-quality versions of other streams.

The multi-party collaboration solution has significant advantages. It enables seamless video conferencing directly within the user's browser. No plugins, downloads or special equipment (beyond a webcam) are needed. The approach enables web-based multi-party video conferencing. The technique enables direct point-to-point and multi-party communications (video conferencing, and real time screen sharing, document collaboration, etc.) between and among end users through the overlay network fabric.

To support the techniques herein, and depending on the implementation of the underlying distribution, the overlay network fabric provides support for multipath packet transport, as described in U.S. Pat. Nos. 6,665,726 and 6,751,673, assigned to Akamai Technologies, Inc. The various connections used in the overlay network and as described typically are secured via SSL or other transport layer security (TLS) techniques. Further, the use of the overlay network to provide a peer-to-peer relay as described in U.S. Pat. No. 9,137,196 may also be utilized. That approach facilitates implementation of the TURN protocol ("Traversal Using Relay NAT," as specified in Internet Request for Comment 5766), as well as STUN protocol, as described in RFC 3489. In the relay approach, each peer executes an application (e.g., a video calling application), and the peers communicate with one another, preferably using a relay service established by the overlay network service provider. The overlay network comprises sets of servers, typically organized as edge regions. Each region typically comprises multiple edge servers, each of which is a machine such as has been described above. An edge region may comprise a single relay server. A directory service, which may be part of the overlay network or a service associated with a third party, is used to facilitate communications between the peers even if each peer is behind a NAT device. In the relay approach, each client (a peer) has a connection to a directory service. The directory service performs DNS lookups to determine which overlay network relay server (a virtual IP, or VIP) to which each of the clients should connect. The directory service then tells each client the VIP it should use and the VIP the other machine will use. The directory service also assigns a unique connection ID for the end-to-end connection. Each client then sends a session allocation request to the assigned overlay relay server. The allocation request includes the connection ID and the remote peer's relay server VIP. The overlay relay server responds with the NAT IP/port that was provisioned for the connection. The information is relayed to the remote peer via the directory service. Each client then sends a channel binding request to its assigned overlay relay server, indicating the NAT IP/port of the remote peer. At this point, each overlay relay server is aware of all necessary identifying information for the connection, namely: connection ID, each client's NAT IP/port, and each client's relay server VIP (and service port, if it is necessary for the port to be different).

Each above-described process preferably is implemented in computer software as a set. of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The techniques herein generally provide for the above-described improvements to a technology or technical field, as well as the specific technological improvements to various fields including collaboration technologies including videoconferencing, chat, document sharing and the like, distributed networking, Internet-based overlays, WAN-based networking, efficient utilization of Internet links, and the like, all as described above.

Having described our invention, what we claim follows below:

1. A method carried out at a client machine, the client machine being one of a set of machines participating in a multi-party conference that is facilitated using an overlay network platform, the client machine associated with a user, comprising:
    given a set of audio streams that are being received, computing a three-dimensional (3D) position for each of the audio streams in a 3D soundscape using a script executing in a browser, wherein the 3D position for each audio stream is computed by identifying a target area region of space in front of the user, and identifying a relative position of each of a set of remote users in the multi-party conference as follows: (a) applying a hash function to a unique identifier associated with the remote user of the set of remote users to generate a number, (b) based on the number generated for each of the set of remote users, assigning each of the remote users a relative left-right position within the target area region of space in front of the user, and (c) adjusting a front-back position of at least one of the remote users relative to the assigned left-right positions; and
    rendering, in the browser, each of the audio streams at the 3D position computed;
    wherein the browser renders the audio streams using a Hypertext Markup Language Version 5 (HTML5) Web Audio Application Programming Interface (API).

2. The method as described in claim 1 wherein, with respect to a location of a listener, the target area region is defined by a 45° cone.

3. The method as described in claim 1 wherein the 3D position of the at least one of the remote users also is based on a position on a display screen where a video of the speaker that generates that audio stream is located.

4. The method as described in claim 1 wherein the 3D position of the at least one of the remote users also is based on contextual information related to content of the audio stream.

5. The method as described in claim 1 wherein, with respect to the relative left-right positions, audio streams of the remote users are evenly spaced within the target area region of space.

6. The method as described in claim 5 wherein the audio streams are evenly spaced by applying the hash function to the unique identifier, the unique identifier being a remote user's name.

7. The method as described in claim 1 further including re-adjusting the front-back position of the at least one of the remote users relative to the assigned relative left-right positions.

8. A computer program product in a non-transitory computer readable medium to render audio of different participants in a multi-party conference at different positions in a three-dimensional (3D) space, the computer program product comprising computer program instructions executed in a hardware processor of a client data processing system to carry out a set of operations, the client data processing system associated with a user, comprising:
    given a set of audio streams that that are being received, computing a 3D position for each of the audio streams in a 3D soundscape using a script executing in a browser, wherein the 3D position for each audio stream is computed by identifying a target area region of space in front of the user, and identifying a relative position of each of a set of remote users in the multi-party conference as follows: (a) applying a hash function to a unique identifier associated with the remote user of the set of remote users to generate a number, (b) based on the number generated for each of the set of remote users, assigning each of the remote users a relative left-right position within the target area region of space in front of the user, and (c) adjusting a front-back position of at least one of the remote users relative to the assigned left-right positions; and
    outputting each of the audio streams at the 3D position computed;
    wherein the audio streams are output in the browser using a Hypertext Markup Language Version 5 (HTML5) Web Audio Application Programming Interface (API).

9. The computer program as described in claim 8 wherein the 3D position of at least one remote user also is based on contextual information related to content of the audio stream.

10. The computer program product as described in claim 8 wherein, with respect to a location of a listener, the target area region is defined by a 45° cone.

11. The computer program product as described in claim 8 wherein the 3D position of the at least one of the remote users also is based on a position on a display screen where a video of the speaker that generates that audio stream is located.

12. The computer program product as described in claim 8 wherein, with respect to the relative left-right positions, audio streams of the remote users are evenly spaced within the target area region of space.

13. The computer program product as described in claim 12 wherein the audio streams are evenly spaced by applying the hash function to the unique identifier, the unique identifier being a remote user's name.

14. The computer program product as described in claim 8 further including re-adjusting the front-back position of the at least one of the remote users relative to the assigned left-right positions.

\* \* \* \* \*